March 27, 1928.
P. GWISDALLA
OYSTER OPENER
Filed April 11, 1927
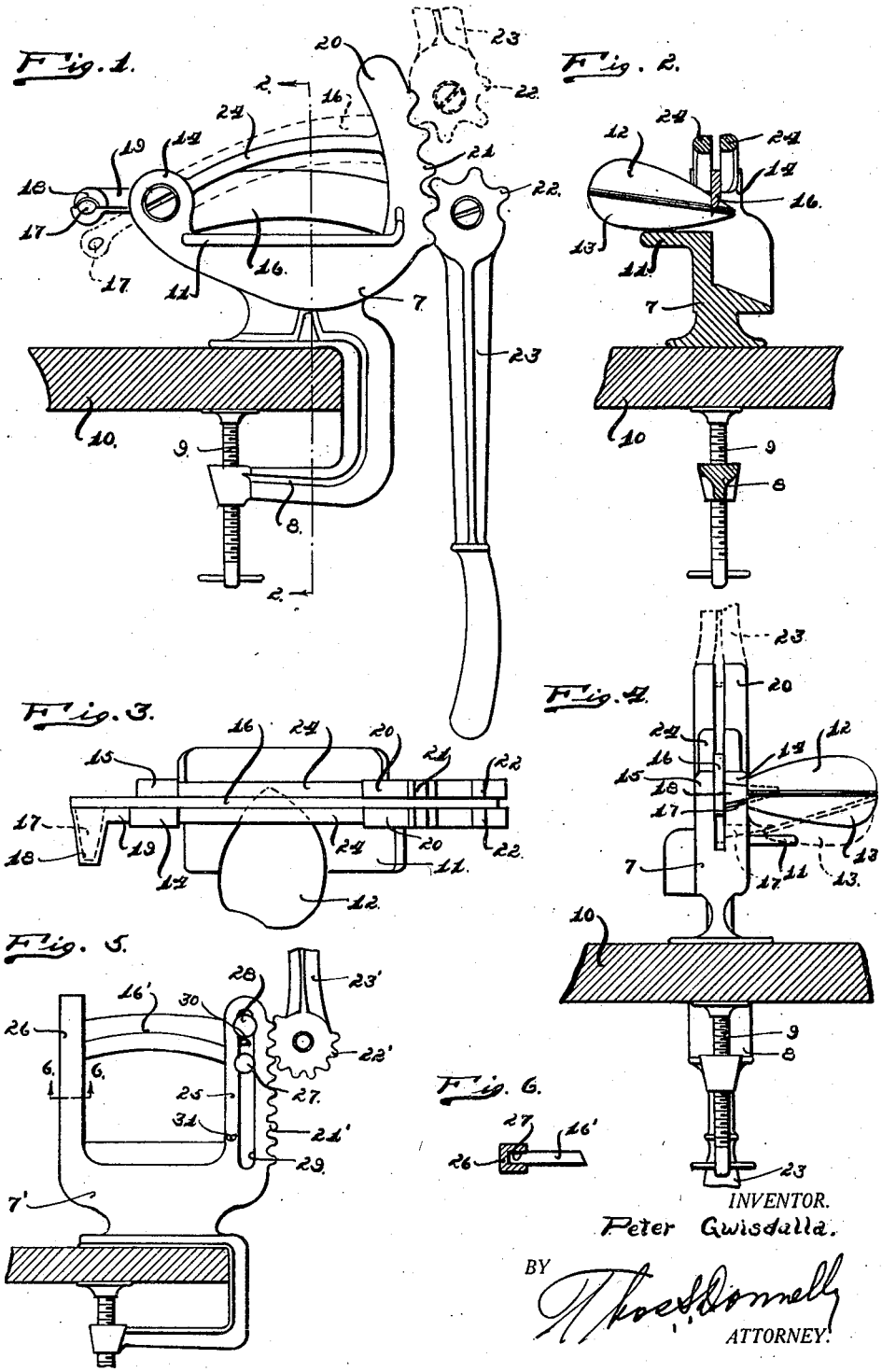
INVENTOR.
Peter Gwisdalla.

Patented Mar. 27, 1928.

1,663,758

UNITED STATES PATENT OFFICE.

PETER GWISDALLA, OF DETROIT, MICHIGAN.

OYSTER OPENER.

Application filed April 11, 1927. Serial No. 182,584.

My invention relates to a new and useful improvement in an oyster opener and has for its object the provision of a machine whereby an oyster or clam may be very easily and quickly opened to permit the removal of the contents therefrom.

Another object of the invention is the provision of a device whereby the shells of an oyster may be easily and quickly spread apart and the oyster prepared for entry of the spreading members between the shells.

Another object of the invention is the provision of a mechanism provided with a pair of members adapted for insertion between oyster shells and having mechanism for spreading the members apart to spread the shells of the oyster apart.

Another object of the invention is the provision of an oyster opener which will facilitate the opening of oysters and result in a considerable saving in time and labor.

Another object of the invention is the provision of an oyster opener which will be simple in structure, economical of manufacture and highly efficient in use.

Other objects will appear hereinafter.

The invention consists in the combination and arrangement of parts hereinafter described and claimed.

The invention will be best understood by a reference to the accompanying drawings which form a part of this specification and in which, Fig. 1 is a side elevational view of the invention showing it applied to a supporting member.

Fig. 2 is a sectional view taken on substantially line 2—2 of Fig. 1.

Fig. 3 is a top plan view of the invention.

Fig. 4 is an end elevational view of the invention.

Fig. 5 is a side elevational view of a modified form of the invention shown in fragment.

Fig. 6 is a sectional view taken on substantially line 6—6 of Fig. 5.

In the drawings I have illustrated a base or supporting member 7 having an angularly turned arm 8 projected therefrom and provided with a screw 9 threaded therein for clamping the device on a support 10, such as a table, bench, or the like. The supporting member 7 is provided at one face with a flange 11 which serves as a table or support upon which the oyster having the shells 12 and 13 may be placed. Projecting upwardly from the supporting member are spaced lugs 14 and 15 between which is pivotally mounted a blade 16, one end of this blade projecting beyond its mounting and provided with the outwardy projecting prong 17 which serves as an engagement member and cooperates with the prong 18 projecting laterally from the extension 19 on the lugs 14 and 15. Extending upwardly from the supporting member is an arcuate arm 20 having teeth 21 which mesh with the teeth 22 formed on the end of the handle or lever 23 which is pivotally connected to the free end of the blade 16. A reinforcing arm 24 serves to connect the arcuate arm 20 with the lugs 14 and 15.

In operation the oyster is placed upon the table 11 as shown in Fig. 2 so that when the handle 23 is rocked, the knife blade 16 or cutting element is brought downwardly so as to clip off the edges of the shells 12 and 13. When this is done and the handle is in the position shown in full lines in Fig. 1, the oyster is positioned as shown in Fig. 4, the engagement members or prongs 17 and 18 engaging between the shells 12 and 13. The handle is then raised upwardly into the position shown in dotted lines in Fig. 1 so as to move the knife blade or cutting element 16 upwardly from the supporting member 7. When this movement is effected the prong or engagement member 17 is moved into the position shown in dotted lines in Fig. 1 so that the engagement member or prong 17 is withdrawn from the engagement member or prong 18 and a separation of the shells 12 and 13 is effected, as shown in Fig. 4. This separation is sufficient to overcome the muscular resistance of the oyster and prevent a subsequent closing of the shells together by the oyster so that a person, by gripping the shells in the hands, may separate them entirely and remove the contents therefrom.

In this manner there is provided an easy and quick method of separating the shells of an oyster and opening it for the purposes intended.

In the modified form shown in Fig. 5 and Fig. 6 I have provided a slightly different structure in which the handle 23' is provided with teeth 22' meshing with teeth 21' formed on an arm 25 which extends upwardly from the supporting member 7', and is parallel to the arm 26 having the groove 27 formed therein. A blade or cutting element 16' rides in this groove and carries the studs 27 and 28 which engage in the elongated slot 29 formed in the member 25. Fixed to the knife blade or cutting element 16' is an engagement member or prong 30 which cooperates with the engagement member or prong 31 fixedly mounted on the arm 25. The operation is as already described, a cutting and separation of the oyster being easily and quickly effected.

While I have illustrated and described the preferred form of my invention, I do not wish to limit myself to the precise details of structure shown, but desire to avail myself of such variations and modifications as come within the scope of the appended claims.

Having thus described my invention what I claim as new and desire to secure by Letters Patent is:

1. An oyster opener of the class described, comprising: a supporting member; a cutting member movably mounted on said supporting member; an engagement member fixedly mounted on said supporting member for engaging between the shells of an oyster; a movable engaging member for engaging between the shells of an oyster; and common means for moving said cutting member relatively to said supporting member and said engagement members relatively to each other.

2. An oyster opener of the class described, comprising: a supporting member; an engagement member projecting outwardly from one side of said supporting member; a cutting member pivotally mounted on said side of said supporting member; a co-operating engaging member movable in unison with said cutting member and approaching said engagement member upon movement of said cutting member to cutting position and withdrawing therefrom upon movement of said cutting member in the opposite direction.

3. An oyster opener of the class described, comprising: a supporting member; an engagement member projecting outwardly from one side of said supporting member; a cutting member pivotally mounted on said side of said supporting member; a co-operating engaging member movable in unison with said cutting member and approaching said engagement member upon movement of said cutting member to cutting position and withdrawing therefrom upon movement of said cutting member in the opposite direction; and means for moving said cutting member on its pivot.

4. An oyster opener of the class described, comprising: a supporting member; a lug projecting upwardly from said supporting member adjacent one end thereof; an extension on said lug; a prong projecting laterally outwardly from the outer end of said extension; a cutting member mounted pivotally on said lug adjacent one end; a cooperative prong projecting laterally outwardly from said end of said cutting element for co-operating with said first mentioned prong, said co-operating prong moving into approach with said first mentioned prong upon movement of said cutting element to cutting position and withdrawing from said first mentioned prong upon movement of said cutting element in the opposite direction.

5. An oyster opener of the class described, comprising: a supporting member; a lug projecting upwardly from said supporting member adjacent one end thereof; an extension on said lug; a prong projecting laterally outwardly from the outer end of said extension; a cutting member mounted pivotally on said lug adjacent one end; a co-operative prong projecting laterally outwardly from said end of said cutting element for co-operating with said first mentioned prong, said co-operating prong moving into approach with said first mentioned prong upon movement of said cutting element to cutting position and withdrawing from said first mentioned prong upon movement of said cutting element in the opposite direction; an arcuate bar projecting upwardly from said supporting member; a lever pivotally mounted on the other end of said cutting element; and teeth formed on the pivoted end of said lever for meshing with said rack bar, the rocking of said lever on its pivot effecting a movement of said cutting element to operative or inoperative position dependent upon direction of rocking.

In testimony whereof I have signed the foregoing specification.

PETER GWISDALLA.